United States Patent Office 3,106,536
Patented Oct. 8, 1963

3,106,536
EPOXY ESTERS OF POLYHALO-POLYCYCLIC ACIDS
Herbert A. Newey, Lafayette, and Roy T. Holm, Orinda, Calif., assignors to Shell Oil Company, New York, N.Y., a corporation of Delaware
No Drawing. Filed Mar. 21, 1960, Ser. No. 16,173
3 Claims. (Cl. 260—2)

This invention relates to new epoxy esters. More particularly, this invention relates to epoxyalkyl diesters of polyhalo-polycyclic dicarboxylic acids. The invention is also concerned with the new compounds when in the polymerized state.

Epoxy esters and the resins resulting from their polymerization have been put to practical uses too numerous to mention. One of the many commercial uses where they may be found, for example, is in the production of paper laminates. These paper laminates may in turn be used in the manufacture of electronic printed circuits since they have most of the properties desirable for such a purpose. Due to the presence of large amounts of radiant heat given off by electronic equipment while being operated, epoxy esters and resins having the additional property of being fire-resistant have long been sought. Similarly, when epoxy esters and resins have been employed for many other purposes, resistance to heat and fire has also been a fervently desired property.

It is an object of this invention to provide a new class of epoxy esters and a method for their preparation. It is a further object to provide new epoxy esters in their polymerized state. It is an object of this invention to provide new epoxy compounds that are heat- and fire-resistant.

These and other objects which will appear from the following detailed description have now been satisfied by the discovery of compounds having the structural formula

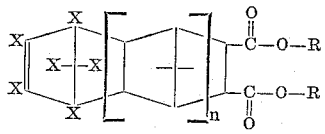

wherein each X is a halogen atom, n is an integer from 0 to 3, and R is an epoxy alkyl radical. It is preferred that n=0 and X is a chlorine atom. It is also preferred that the alkyl chain of R have from 3 to 20 carbon atoms.

Typical examples of compounds included within the scope of this invention among others are:

Di(2,3-epoxypropyl)-5,6,7,8,9,9-hexachloro-1,2,3,4a,5,8,8a-octahydro-1,4,5,8-dimethanonaphthalene-2,3-dicarboxylate;
di(3,4-epoxybutyl)-1,4,5,6,7,7-hexabromobicyclo-(2.2.1)-5-heptene-2,3-dicarboxylate;
di(2,3,5,6-diepoxydodecanyl)-1,4,5,6,7,7-hexafluoro-bicyclo-(2.2.1)-5-heptene-2,3-dicarboxylate; and
di(4-ethyl-6,7-epoxyeicosanyl)-1,4,5,6,7,7-hexiodo-bicyclo-(2.2.1)-5-heptene-2,3-dicarboxylate;
di(2,3-epoxybutyl)-1,4,5,6,7,7-hexachlorobicyclo-(2.2.1)-5-heptene-2,3-dicarboxylate;
di(4,5-epoxypentyl)-1,4,5,7-tetrachloro-6,7-difluoro-bicyclo-(2.2.1)-5-heptene-2,3-dicarboxylate;
di(2,6-dimethyl-11,12-epoxydodecyl)-1,4,5-trichloro-6,7,7-tribromobicyclo-(2.2.1)-5-heptene-2,3-dicarboxylate;
di(2,3,7,8,14,15-triepoxypentadecyl)-1,4,5,6,7,7-hexa-chlorobicyclo-(2.2.1)-5-heptene-2,3-dicarboxylate.

Thus it will be seen from the foregoing specific examples that the new compounds encompassed by this invention may have a number of carbon rings joined together upon which are substituted any six halogen atoms. In addition, the epoxy alkyl radical may contain more than one but not over three vicinal epoxy groups, each attached to any two adjacent chain carbon atoms. The alkyl chain may be either a straight or branched chain.

These novel epoxy esters may be polymerized by cross-linking with any of the known polymerization agents that are used for such a purpose with epoxy compounds, to form highly useful fire-resistant epoxy resins. For example, BF$_3$ complexes, various acid anhydrides, and many amines will form cross-linked polymers with epoxy compounds such as those previously herein described. Suitable acid anhydrides include all anhydrides of dibasic acids such as succinic, maleic, phthalic and its derivatives which are substituted in the nucleus. Suitable amines include those compounds having two or more primary amino groups such as ethylenediamine, phenylenediamine, and the like. Corresponding secondary amines may likewise be used. Combinations of anhydrides and amines can also be used to link epoxy esters. Compounds that perform such a linking function are known in the art as epoxy curing agents.

While it is possible to adapt other methods for the production of esters to the synthesis of our compounds, we have found two particular methods that are especially suited to obtaining the desired result. The first method to be described is applicable to the production of one species while the other method to be described is of general applicability.

For ease of description, the following methods illustrate the production of compounds containing the 1,4,5,6,7,7-hexahalobicyclo-(2.2.1)-5-heptene structure. It will be readily understood by those skilled in the art that the compounds of this invention having additional rings, such as those containing the corresponding dimethano-naphthalene structure, may be obtained by substituting the appropriate acid or anhydride for the indicated bicyclo heptene acid or anhydride. For further ease of description, the following methods are also limited to chlorine-substituted compounds but it will be equally obvious that corresponding starting materials containing the other halogen atoms will produce corresponding products with the other halogen atoms as substituents.

Regardless which of the two following methods is to be used, the halogen-containing dicarboxylic acid or anhydride corresponding to the desired ester will be one of the starting reactants. For the reasons previously explained and due to its ready availability, 1,4,5,6,7,7-hexachlorobicyclo-(2.2.1)-5-heptane-2,3-dicarboxylic acid (chlorendic acid) will be used as an example. The anhydride is interchangeable with the acid throughout the following description, although the acid is preferred. Chlorendic anhydride is formed by reacting about equimolar amounts of hexachlorocyclopentadiene with maleic anhydride, the acid form being obtained from this if desired.

One of the two preferred methods for producing our novel esters is specific for the production of the di(2,3-epoxypropyl) ester. It comprises reacting the polyhalo-genated dicarboxylic acid with an epihalohydrin such as epichlorohydrin in the presence of a minor amount of a quaternary salt or a tertiary amine, and slowly adding base to the mixture. The ratio of epichlorohydrin to acid may vary over a considerable range. The epihalohydrin has been used in the mole ratio of from 20:1 to 40:1 of the acid with successful results. However, both lower and higher ratios are also operable. The base preferred is potassium hydroxide and may be used in amounts varying from the stoichiometric amount to about a 5% excess or more with satisfactory results. Other suitable bases include the alkaline earth metal oxides and hydroxides and the alkali metal hydroxides such as sodium and lithium hydroxide.

The quaternary salts that may be used as catalysts for the reaction are those of the formula

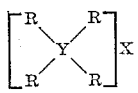

wherein Y is nitrogen, phosphorous or arsenic, X is an ion of an inorganic acid, and R is a hydrocarbon radical, such as an alkyl, cycloalkyl, aryl, alkaryl, arylalkyl, and the like, radicals. Examples of these salts include, among others, benzyltrimethylammonium chloride, phenyltributylammonium chloride, cyclohexyltributylammonium sulfate, benzyltrimethylammonium sulfate, benzyltrimethylphosphonium chloride, phenyltrioctylammonium sulfate, phenyltriethylarsonium chloride, tetramethylammonium chloride, tetrabutylammonium sulfate, tetraoctylammonium nitrate, diphenyldimethylammonium borate, diphenyldioctylammonium chloride, benzyltrimethylammonium borate, diphenyldimethylphosphonium chloride, dicyclohexyldiethylarsonium chloride, benzyltrinonylammonium chloride, and benzyltridodecylammonium sulfate.

Particularly preferred quaternary salts to be used in the process are those of the formula

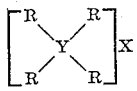

wherein Y is nitrogen, R is an alkyl, aryl or arylalkyl radical, preferably containing no more than 12 carbons, and X is a chlorine or bromine, such as benzyltrimethylammonium chloride, benzyltrimethylammonium bromide, cyclohexyltrimethylammonium bromide, phenyltrioctylammonium chloride, tetrabutylammonium chloride and tetraoctylammonium chloride. Tetramethylammonium bromide is the most preferred quaternary salt catalyst for the purposes of the present invention.

The tertiary amines that may be used as catalysts are those mono- or poly-amines having an open chain or cyclic structure which have all of the amine hydrogen replaced by suitable substituents, such as hydrocarbon radicals, and preferably aliphatic, cycloaliphatic, or aromatic radicals. Examples of these amines include, among others, triethylamine, tributylamine, dimethyl benzylamine, triphenylamine, tricyclohexylamine, pyridine, quinoline, and the like.

Preferred amines are the trialkyl, tricycloalkyl and triaryl amines, such as triethylamines, triphenylamine, tri-(2,3-dimethylcyclohexyl)amine, and the like. Weak tertiary amines, e.g., amines that in aqueous solution given a pH less than 10, are particularly preferred.

The amount of the tertiary amine or quaternary salt to be used in the process may vary over a considerable range. Generally, the amine or salt will be employed in amounts varying from about 0.01% to 5% by weight of the acid reactant. Preferred amounts vary from about 0.01 to 3% by weight of the acid. The reaction may be conducted, if desired, without the employment of catalyst. The catalyst is employed merely to effect quality improvement in the product.

The reaction may be carried out at a temperature of from about 90° C. to about 125° C. or above at atmospheric pressure. Temperatures below this range may be employed under vacuum or pressure. It is preferred to carry out the reaction at about 90–115° C. at atmospheric pressure.

The details of the procedure will be most easily comprehended by a consideration of the following examples. It is to be expressly understood that all of the examples given are set forth primarily for the purpose of illustration and any specific enumeration of detail therein should not be interpreted as limitations, except as indicated in the appended claims.

*Example I*

47.6 g. (0.126 M) of chlorendic acid was dissolved in 234 g. (2.53 M) of epichlorohydrin (20:1 ratio). 1 g. of tetramethyl ammonium bromide was used as the catalyst. The solution was heated to refluxing and 17.6 g. of KOH (85%) in 15 ml. of water was added dropwise over a period of 50 minutes while azeotroping off water. The temperature at the start was 120° C. and was between 113°–115° C. during the course of the addition of the KOH. The reaction mixture filtered easily. Residual epichlorohydrin was flashed off at 120° C./1 mm. Hg. The product was a brown sticky solid at room temperature. The unwashed product weighed 59 g. for a calculated 95.5% yield.

*Example II*

The procedure of Example I was repeated, using 0.2 mole of acid, epichlorohydrin in a mole ratio of 40:1 excess over the acid, 1 g. of tetramethyl ammonium bromide, and the stoichiometric amount of KOH. The reaction was run between 93–95° C. with the addition of the KOH taking 52 minutes. The product was washed and calculated to have resulted in a 100% yield.

Analysis of the product gave the following data, confirming that the expected product of Examples I and II was in fact di(2,3-epoxypropyl)-1,4,5,6,7,7-hexachlorobicyclo-(2.2.1)-5-heptene-2,3-dicarboxylate.

|  | Epoxide, eq./100 g. | Chlorine, percent wt. | Molecular Wt. |
|---|---|---|---|
| Theory | 0.401 | 42.4 | 503 |
| Found | 0.316 | 43.0 | 530 |

*Example III*

Five grams of the product described in Example II was used in the preparation of a casting. The five grams was mixed with 6.5 parts per hundred m-phenylenediamine and cured overnight at 100° C. The casting was solid at room temperature.

The other method for the production of our novel compounds is of general applicability to any of the compounds encompassed by the invention. Broadly, it comprises making a lower alkyl diester of the polyhalogenated acid corresponding to the desired ester, and by an ester interchange reaction with an epoxyalkyl ester of a lower alkyl carboxylic acid, producing an epoxyalkyl diester of the polyhalogenated acid. Suitable epoxyalkyl esters of lower alkyl carboxylic acids include the epoxyalkyl acetates, epoxyalkyl butyrates, epoxyalkyl propionates and the like. The epoxyalkyl acetates are preferred and will be used in the subsequent examples.

To make any one of the particular novel compounds encompassed by this invention it is only necessary to select the appropriate polyhalogenated acid in making its lower alkyl ester, and to select the epoxyalkyl acetate having the particular epoxyalkyl radical that is contained in the product desired. The general reaction can be depicted as

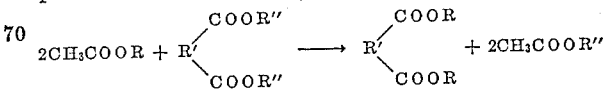

where R represents an epoxyalkyl group, R″ represents a lower alkyl group, and R′ represents the nucleus of a polyhalogenated polycyclic dibasic acid. For example, to make any of the products of the following equations, the indicated starting materials may be used.

(1) 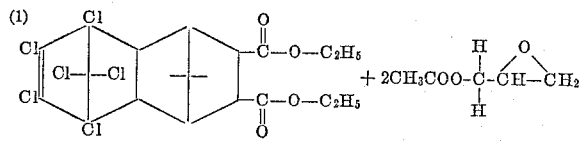

↓

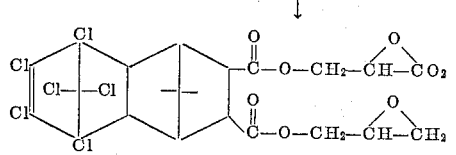

(2) 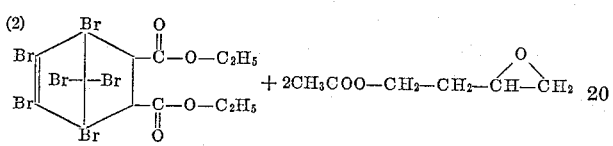

↓

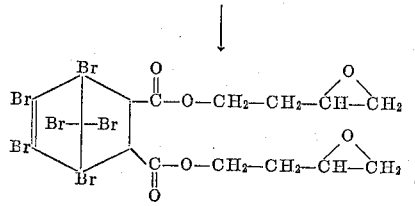

(3) 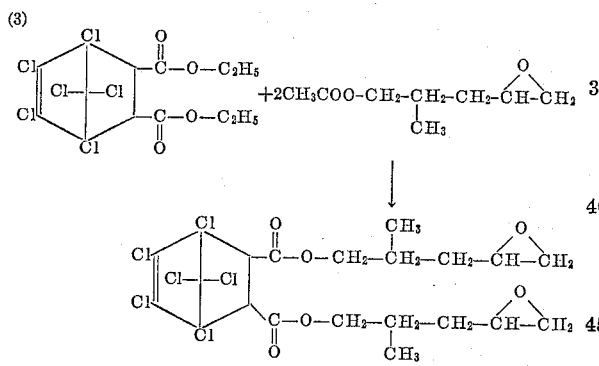

The ethyl ester starting materials indicated above are readily obtained by esterifying the corresponding acids with ethanol. Ethyl acetate is obtained as an additional product in the above examples.

The conditions necessary for successfully carrying out this ester interchange reaction are best illustrated by the following example.

*Example IV*

To a 1-liter flask fitted with a stirrer, condenser, and thermometer, was added 185.0 g. of chlorendic anhydride (½ mole) and 230.0 g. of ethanol (5 moles). The mixture was refluxed for two hours and 100 ml. of benzene was then added. Using a column, refluxing was continued for another hour. Three grams of p-toluene sulfonic acid was added and the mixture refluxed for another hour. At a kettle temperature of 125° C., most of the benzene and alcohol was distilled off. 230 g. of ethanol and 100 ml. of toluene was added and then distilled off at a kettle temperature of 127° C. This latter step was repeated. Then the solution was put into a 1-liter separatory funnel and washed with 1 liter of 5% sodium bicarbonate solution followed by a wash with 1 liter of distilled water. The product was then topped under a vacuum, the final kettle temperature being 129° C. at 1 mm. of Hg. The crude product weighed 161 g. and after recrystallization from hot n-heptane weighed 152 g. This diethyl ester of chlorendic acid had a melting point of 74° C.

In a 300 ml. flask fitted with a thermometer, magnetic stirrer, and a distilling head, were placed 44.4 g. of the ester prepared above, along with 116 g. of glycidyl acetate and 1.6 g. of potassium tertiary butoxide catalyst. The mixture was stirred at 110° C. for four hours with no ethyl acetate distilling off. After standing overnight, the flask was heated to 140° C., at which time ethyl acetate began distilling off. Distillation was continued at 140–155° C. until 12 ml. of ethyl acetate was collected. Then the mixture was distilled under a vacuum while holding the temperature below 80° C. The distillate of this latter step was 67 ml. of glycidyl acetate. The resulting crude product in the flask was black in color. It was cooled, dissolved in toluene, stirred with charcoal, and then filtered. The product was then washed five times with a total of 500 ml. of water. The toluene and remaining glycidyl acetate were then distilled off at a maximum temperature of 80° C. at about 1 mm. Hg. 480 g. of the diglycidyl ester of chlorendic acid product was obtained. A titration for epoxide gave a value of 0.297 eq./100 g.

Epoxy esters obtained by one of the foregoing methods are themselves useful for their fire-resistant properties or they may be used as intermediates in the formation of other compounds. In particular, they may be used in the formation of cross-linked polymers as illustrated by the following example.

*Example V*

Ten grams of the ester prepared in Example IV was cured with 0.83 g. of m-phenylenediamine for four hours at 100° C. followed by one hour at 200° C. The resulting polymer exhibited a Barcol Hardness of 45 at room temperature.

The novel epoxy esters may also be combined with the polyether polyepoxides described in U.S. 2,633,458, patented March 31, 1953, in a ratio sufficient for resin formation. When this resin is cured by the methods and materials also taught by that patent, a fire-resistant epoxy resin having outstanding flexibility and impact strength will result.

We claim:

1. An insoluble, infusible, fire-resistant product obtained by heating a vic-epoxy ($C_3$–$S_{20}$) alkyl diester of 1,4,5,6,7,7 - hexahalobicyclo - (2.2.1)-5-heptene-2,3-dicarboxylic acid and an epoxy curing agent.

2. An insoluble, infusible, fire resistant product obtained by heating di(2,3-epoxypropyl) 1,4,5,6,7,7-hexachlorobicyclo-(2.2.1)-5-heptene-2,3-dicarboxylate with an epoxy curing agent.

3. An insoluble, infusible, fire-resistant product obtained by heating di(2,3-epoxypropyl) 1,4,5,6,7,7-hexachlorobicyclo - (2.2.1)-5-heptene-2,3-discarboxylate with phenylenediamine.

References Cited in the file of this patent

UNITED STATES PATENTS

| | | |
|---|---|---|
| 2,744,845 | Rudoff | May 8, 1956 |
| 2,761,870 | Payne et al. | Sept. 4, 1956 |
| 2,772,296 | Mueller | Nov. 27, 1956 |
| 2,810,712 | Baranauckas | Oct. 22, 1957 |
| 2,951,829 | Chiddix | Sept. 6, 1960 |

FOREIGN PATENTS

| | | |
|---|---|---|
| 219,451 | Australian | Feb. 27, 1958 |
| 766,771 | Great Britain | Jan. 23, 1957 |